United States Patent [19]

Kenmochi

[11] Patent Number: 4,663,824

[45] Date of Patent: May 12, 1987

[54] ALUMINUM ELECTROLYTIC CAPACITOR AND A MANUFACTURING METHOD THEREFOR

[75] Inventor: Kazuei Kenmochi, Hirakata, Japan

[73] Assignee: Matsushita Electric Industrial Co., Ltd., Osaka, Japan

[21] Appl. No.: 709,948

[22] PCT Filed: Jul. 5, 1984

[86] PCT No.: PCT/JP84/00345
§ 371 Date: Mar. 4, 1985
§ 102(e) Date: Mar. 4, 1985

[87] PCT Pub. No.: WO85/00463
PCT Pub. Date: Jan. 31, 1985

[30] Foreign Application Priority Data

Jul. 5, 1983 [JP] Japan ............... 58-123071
Jul. 5, 1983 [JP] Japan ............... 58-123072

[51] Int. Cl.[4] ............... H01G 9/00; B29F 1/10
[52] U.S. Cl. ............... 29/570; 361/433; 264/272.18

[58] Field of Search ............... 361/433, 308, 309, 310; 29/570; 264/272.18

[56] References Cited

U.S. PATENT DOCUMENTS 4,205,365 5/1980 Kalina ............... 361/308
4,558,399 12/1985 Toyama et al. ............... 361/433

Primary Examiner—Donald A. Griffin
Attorney, Agent, or Firm—Wenderoth, Lind & Ponack

[57] ABSTRACT

An aluminum electrolytic capacitor provided in a container including a resin casing integral with a pair of terminals perforating therethrough and a resin lid coupled to the resin casing with an element which includes an anode aluminum foil, a cathode aluminum foil and separators, which are superposed in layers, so that the anode aluminum foil and one of the terminals are connected electrically through a lead, the cathode aluminum foil and the other lead are connected similarly through another lead, and an electrolyte is impregnated into the separators, thereby obtaining the aluminum electrolytic capacitor which is well sealed, is very heat resistant and will not short circuit.

3 Claims, 9 Drawing Figures

F I G. 2
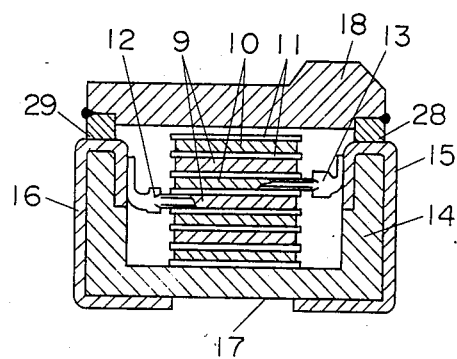

ALUMINUM ELECTROLYTIC CAPACITOR AND A MANUFACTURING METHOD THEREFOR

FIELD OF THE INVENTION

This invention relates to an aluminum electrolytic capacitor and a manufacturing method therefor and aims at the provision of an aluminum electrolytic capacitor which is superior in heat resistance during the soldering thereof and is capable of being miniaturized.

BACKGROUND OF THE INVENTION

Referring to FIG. 1, dry aluminum electrolytic capacitor most widely used among the aluminum electrolytic capacitors is so constructed that an element comprising anode aluminum foil 4 and cathode aluminum foil 5, which are wound and partitioned by separators 6, is provided in a space enclosed with an aluminum casing 1, a rubber packing 2 and a plastic plate 3. and An anode lead 7 and a cathode lead 8 are fixed to the rubber packing 2 or plastic plate 3 in holes previously bored, the separators 6 being impregnated with an electrolyte, such as a solution or organic or inorganic salt or a liquid of large ionization constant, for facilitating electrical connection of anode aluminum foil 4 with cathode aluminum foil 5. Also, the aluminum casing 1 is contracted in part to keep mechanical connection of the aluminum casing 1 and rubber packing 2.

The aluminum electrolytic capacitor constructed as described in the foregoing is often used as an electric circuit element because it is large in electrostatic capacity and low in cost. On the other hand, the circuit element has a tendency to be used in a chip because it is demanded that the productivity and the circuit element density of a substrate are expected to be improved by use of the face-bonding.

Such as aluminum electrolytic capacitor, however, contains therein a liquid, thereby creating the following problems:

1. The electrolyte is apt to vaporize due to the heat developed during the soldering process (250° through 260° C. at a temperature of soldering), which is remarkable especially in the dipping process of chipping the circuit element and soldering it while being dipped in molten solder, so that pressure in the aluminum casing 1 rises to break and scatter the rubber packing 2 or plastic plate 3, or the inner liquid may leak outwardly between the lead 7 or 8 and the rubber packing 2, thereby causing the characteristic of circuit element to deteriorate. Hence, it is required in designing the circuit element that the lead only comes into contact with solder, which has put a large restriction on the design.

2. The combination of several parts requires extra space in the casing, which hinders mintaturization of the element.

SUMMARY OF THE INVENTION

A manufacturing method for an aluminum electrolytic capacitor of the invention comprises the steps of forming a resin casing molded to be integral with a pair of terminals perforating the walls of the casing, inserting an aluminum electrolytic capacitor element into the resin casing, electrically connecting anode and cathode aluminum foils with the pair of terminals, guiding an electrolyte into the resin casing, and coupling the resin casing with a resin lid, so that the aluminum electrolytic capacitor element obtained is provided within a space enclosed with the resin lid and the resin casing molded integrally with the aforesaid pair of terminals, and the anode and cathode aluminum foils are electrically connected with each other, thereby enabling the aluminum electrolytic capacitor to be superior in sealing the electrolyte and also in strength.

BRIEF DESCRIPTION OF THE DRAWINGS

FIG. 2 is a sectional view of an embodiment of the invention which is an aluminum electrolytic capacitor of face-bonding type.

PREFERRED EMBODIMENTS OF THE INVENTION

Figure 1:
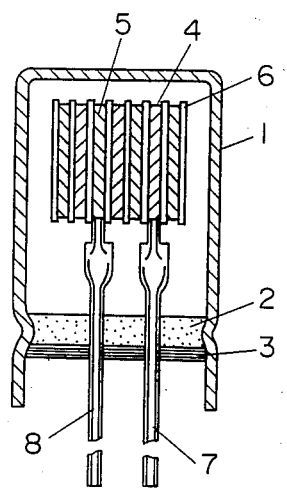
FIG. 1 is a sectional view of the conventional aluminum electrolytic capacitor.

Next, an embodiment of the invention will be described with reference to FIG. 2, in which anode aluminum foils 9 and cathode aluminum foils 10 are partitioned with separators 11 and laminated and wound, the anode aluminum foil 9 being calked with a lead 12, the cathode aluminum foil 10 being calked with a lead 13 opposite to the lead 12, and the separator 11 being impregnated with an electrolyte of solvent, such as ethylene glycol, methyl cellulose, or dimethylformamide, into which the salts are dissolved.

A resin casing 14 is formed of resin, such as epoxy resin, silicon resin, polyimide, polyoxybenzylene, polyether etherketone, or polyether sulfone, superior in heat resistance, and terminals 15 and 16 perforate the side walls of casing 14 in part and are bent at the projecting ends inwardly and outwardly from and along the side walls and fixed in part onto the outside surface of the bottom of casing 14, the bent ends of terminals 15 and 16 within the casing 14 being welded with the leads 13 and 12 to be electrically connected therewith and maintaining the mechanical strength also.

A lid 18 is molded and composed of the same material as the resin casing 14, and the joint of lid 18 with casing 14 is thoroughly fixedly welded by an instant heating method using a heating plate or a laser.

The aluminum electrolytic capacitor constructed in the foregoing manner provides a construction corresponding to the face-bonding process, in which the terminals 15 and 16 provided at the bottom 17 of resin casing 14 are respectively connected to separately conducting routes at a circuit substrate (not shown).

Figure 3:
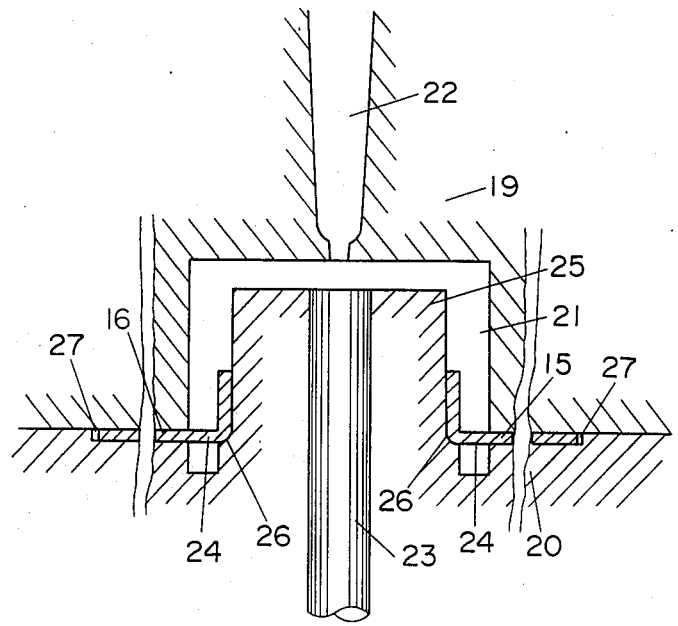
FIG. 3 is a sectional view of a metal mold for manufacturing the resin casing illustrated in FIG. 2.

FIG. 3 is a sectional view explanatory of a metal mold and a method for manufacturing the resin casing 14, in which a bore 22 communicating with a cavity 21 formed of a stationary template 19 and a movable template 20, is provided at the stationary template 19. At the movable template 20 before closing of the mold are set the terminals 15 and 16 in such a manner that one end of each abuts against a core 25 and the other ends are put between the template, and after the mold is closed, resin is injected into the mold through the bore 22 to thereby form a resin body integral with the terminals 15 and 16. The mold is open after resin curing and a projection pin is actuated to obtain a molding including the terminals 15 and 16 exposed therein.

In order to prevent the resin perforating portions 24 of the terminals 15 and 16 from being deformed by charging pressure of resin when molded, the core 25 is provided with surfaces 26 for holding the respective terminals 15 and 16. Also, each groove 27 provided in the movable template 20 is of slightly smaller depth than the thickness of each of the terminals 15 and 16, thereby preventing the terminals 15 and 16 from shifting due to pressure applied thereto, and is larger in length than each terminal.

Also, in order to prevent displacement of each of the terminals 15 and 16 after it is inserted into the movable template until the mold is closed, a magnet is provided below each groove 27, so that a fixing method is adopted which uses the attraction for the plating layer covering each of the terminals 15 and 16 or for the terminal itself, or which uses a lever provided above each groove 27 for mechanically holding each of the terminals 15 and 16 after inserted.

Such resin molding holds the terminals with accuracy and in close contact with the walls, and each bent terminal in the casing 14 is not covered at the surface with resin, thereby ensuring electrical connection of each terminal with the element.

The resin perforating portion 24 of each of the terminals 15 and 16, when previously coated with polymeric material, such as Teflon or isobutylene-isoprene rubber, superior in chemical resistance and rich in resiliency, demonstrates the large effect to prevent the electrolyte or vapor thereof from fly-off from the interfaces 28 and 29 between the resin casing 14 and the terminals 15 and 16.

The inwardly projecting portions of terminals 15 and 16 are limited in material to aluminum because of the characteristic of an aluminum electrolytic capacitor, while, the external portions of the same, especially the portions abutting against the bottom surface 17, are desirably formed of a material superior in soldering efficiency, but not aluminum, whereby the exterior exposed portions of the same have nickel plating applied thereto.

Figure 4:
FIG. 4 is an exterior view of a terminal in a modified embodiment of the invention.

A terminal in a modified embodiment of the invention, which is subjected to the molding process, is shown in FIG. 4. The terminal comprises an aluminum wire 30 and a stripe-like galvanized sheet iron 31, the aluminum wire 30 being calked at 32 in part by the sheet iron 31 in a wrapping fashion and connected therewith.

Figure 5:
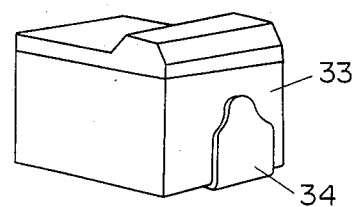
FIG. 5 is an exterior view of an aluminum electrolytic capacitor of face-bonding type using the terminals illustrated in FIG. 4.

FIG. 5 shows the aluminum electrolytic capacitor using the terminal in FIG. 4, in which a terminal 34 perforates a resin casing 33 to extend outwardly, is bent along the surface thereof, and reaches the bottom of the same. Such construction is stable and superior in operating efficiency during the face-bonding with the circuit substrate, and also the portion of the terminal perforating through the resin casing 33 is physically sound in section and superior in efficiency for sealing the electrolyte.

The position where each terminal perforates the resin casing is not defined in the embodiment, but may be anywhere so long as the pair of terminals do not come into contact with each other. Also, the leads for electrically connecting the aluminum foils with the terminals are not indispensable, but may couple the aluminum foils directly with the latter.

Figure 6:
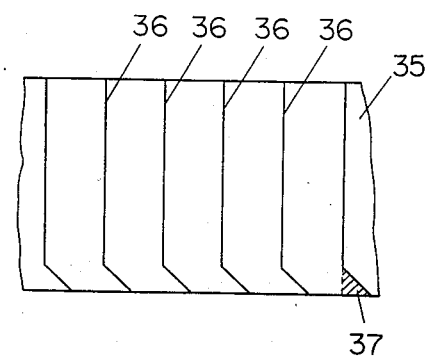
FIG. 6 is an exterior view of aluminum foil used in the manufacturing process of the embodiment of FIG. 2.

FIG. 6 shows another modified embodiment of the invention, showing elongate anode aluminum foil which has been subjected to oxidation treatment, in which foil 35 is cut in a width corresponding to the capacity of the capacitor, and thereafter cut along lines 36, thereby obtaining stripe-like foils each projecting at the corner portions 37 (one of which is hatched in FIG. 6 for clarity) at respective lengthwise ends thereof. The cathode aluminum foil similarly is obtained in such a manner that an elongate foil slightly larger in width than the anode aluminum foil is cut at the same pitch to produce projections 37 in the reverse direction, the separators being cut in a stripe-like shape somewhat larger in width and length than both electrode aluminum foils and not to develop the projections at the respective corresponding lengthwise ends.

Figure 7:
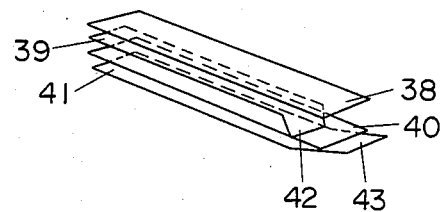
FIG. 7 is an exterior view of an element of the foils illustrated in FIG. 6 with separators superposed in layers.

FIG. 7 shows a first separator 38, a cathode aluminum foil 39, a second separator 40 and an anode aluminum foil 41, which are laminated to each other, in which each interval between the respective layers is magnified for better understanding, the projection 42 of cathode aluminum foil 39 and the projection 43 of anode aluminum foil 41 projecting toward the opposite major sides of each other.

Figure 8:
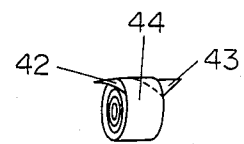
FIG. 8 is an exterior view of the element comprising the wound foils and separators in layers shown in FIG. 7.

FIG. 8 shows the wound-up element 44 which is formed by winding up the stripe-like foils and separator from the minor sides thereof, at which time the cathode aluminum foil 39 is made longer than the anode aluminum foil 41 and terminated inevitably at the outer peripheral side, so that the aluminum oxide layer on the anode aluminum foil 41 is available not in vain as the capacitor. Also, the separators each larger in width and length than both the anode and cathode aluminum foils prevent both the foils from coming into contact with each other to form a short circuit as might be, caused by an assembly error while the foils and separators are being wound up.

Figure 9:
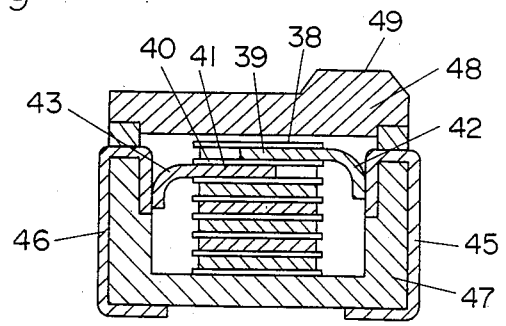
FIG. 9 is a sectional view of an aluminum electrolytic capacitor using the element shown in FIG. 8.

FIG. 9 shows the element obtained by the abovementioned method, which is packaged and assembled. The element 44 comprising the cathode aluminum foils 39 and anode aluminum foils 41 which are partitioned by the separators 38 and 40 and wound up together therewith, is provided within a space enclosed by a resin casing 47 molded to have an anode terminal 45 and a cathode terminal 46 perforating the casing 47, and a lid 48 fixedly stuck to the resin casing 47; the projection 43 of anode aluminum foil 41 is removed in part of the surface aluminum oxide layer and coupled with the anode terminal 46 by use of laser welding or the like; and the projection 42 of cathode aluminum foil 39 is similarly coupled with the cathode terminal 45, thereby functioning as the respective leads, the separators 38 and 40 being impregnated with the electrolyte. Also, a projection 49 formed at the lid 48 serves to discriminate the cathode and anode from each other.

The shape of the projections 42 and 43 in this invention are not defined in this embodiment, but may be rectangular or in a circular arc, and the cutouts at the opposite sides to the projections are not indispensable.

Also, the projections 42 and 43 are not necessarily positioned at the terminations of winding-up, but need only satisfy the requirement that they project sideways in a wound-up condition.

The aluminum electrolytic capacitor constructed as described above is advantageous as follows:

1. There is no need of separately providing the leads and the number of parts and assembly processes are reduced, thereby largely reducing the manufacturing cost.

2. The space occupied by each lead portion is largely reduced to permit miniaturization of aluminum electrolytic capacitor.

3. There is no danger of bringing the leads into contact with each other and the likelihood as a short-circuit in the circuit is extremely lessened, thereby being high in reliability.

This invention has the following effects:

1. The use of a resin casing avoids a short circuit even when the same comes into contact with the aluminum foil.

2. The low thermal conductivity of resin provides poor internal conduction of the heat generated during the soldering, thereby preventing the element from being broken.

3. The interface between the resin casing and each terminal perforating therethrough can be closely sealed, thereby enabling stabilization of the capacitor characteristic for a long time.

4. When the casing is closed tightly with the lid, since both the members are formed of the same material and no terminals or leads are provided at the junction surfaces, the assembly is facilitated and the sealing efficiency is improved.

What is claimed is:

1. A method of manufacturing an aluminum electrolytic capacitor device, comprising the steps of:
    molding a resin casing including an outer wall surrounding an interior space and having an open end opening to the interior space, integrally with a pair of terminals perforating the outer wall so as to extend from the exterior of the casing into the interior space;
    inserting an aluminum electrolytic capacitor element having an anode aluminum foil and a cathode aluminum foil into the interior space;
    electrically connecting the anode aluminum foil to one of the pair of terminals and electrically connecting the cathode aluminum foil to the other of the pair of terminals;
    providing an electrolyte within the resin casing; and
    closing the interior space by covering the open end of the casing with a resin lid
    said step of molding a resin casing including the steps of supporting a first end of each terminal in abutment with a bearing surface of a core of a stationary template, mounting a movable template over the stationary template with a second end of each terminal bent with respect to the first end clamped between the stationary and movable templates with a perforating portion of each terminal extending through an open space in the shape of the casing to be formed between the stationary template and movable template, and injecting a resin material into the open space so as to form the casing with the terminals fixed therein at their respective perforating portions.

2. A method as in claim 1, further comprising the step of forming the element by cutting an anode aluminum foil strip and a cathode aluminum foil strip, each strip having a projection along one side thereof at an end thereof, superposing the strips in layers and winding the superposed strips to form a wound product forming the element with separators between the layers such that the projections on both strips project outwardly from opposite sides of the wound product for being connected to the first ends of the terminals.

3. A method of manufacturing an aluminum electrolytic capacitor device, comprising the steps of:
    molding a resin casing including an outer wall surrounding an interior space and having an open end opening to the interior space, integrally with a pair of terminals perforating the outer wall so as to extend from the exterior of the casing into the interior space;
    forming an aluminum electrolytic capacitor element by cutting an anode aluminum foil strip and a cathode aluminum foil strip, each strip having a projection along one side thereof at an end thereof, superposing the strips in layers and winding the superposed strips to form a wound product forming the element with separators between the layers such that the projections on both strips project outwardly from opposite sides of the wound product for being connected to the terminals inside the casing;
    inserting the aluminum electrolytic capacitor element into the interior space;
    electrically connecting the projection of the anode aluminum foil strip to one of the pair of terminals and electrically connecting the projection of the cathode aluminum foil strip to the other of the pair of terminals;
    providing an electrolyte within the resin casing; and
    closing the interior space by covering the open end of the casing with a resin lid.

* * * * *